United States Patent [19]

MacIntosh, Jr.

[11] Patent Number: 5,733,077
[45] Date of Patent: Mar. 31, 1998

[54] LENS DRILL GUIDE

[75] Inventor: Charles MacIntosh, Jr., Middleboro, Mass.

[73] Assignee: The Hilsinger Company LP, Plainville, Mass.

[21] Appl. No.: 674,562

[22] Filed: Jul. 2, 1996

[51] Int. Cl.[6] .................................................. B23B 49/02
[52] U.S. Cl. ........................................ 408/103; 408/115 R
[58] Field of Search ............................... 408/1 R, 72 B, 408/97, 115 R, 115 B, 241 B, 103

[56] References Cited

U.S. PATENT DOCUMENTS

| | | | |
|---|---|---|---|
| 2,181,746 | 11/1939 | Siebrandt | 128/83 |
| 2,334,614 | 11/1943 | Dzus | 408/97 |
| 2,348,116 | 5/1944 | Dzus | 408/97 |
| 2,351,243 | 6/1944 | Vetter | 408/97 |
| 2,383,953 | 9/1945 | Beard | 77/62 |
| 2,576,801 | 11/1951 | Michael | 408/97 |
| 3,278,957 | 10/1966 | Curran | 408/97 |
| 4,311,419 | 1/1982 | Block | 408/1 R |
| 4,978,256 | 12/1990 | Wellington et al. | 408/72 R |
| 5,067,859 | 11/1991 | Korbonski | 408/1 R |
| 5,154,548 | 10/1992 | Walsh | 408/72 R |
| 5,163,792 | 11/1992 | Slavik | 408/97 |
| 5,222,845 | 6/1993 | Goldstein et al. | 408/103 |
| 5,322,396 | 6/1994 | Blacker | 408/72 R |
| 5,409,329 | 4/1995 | Juang | 408/115 R |

FOREIGN PATENT DOCUMENTS 154073  11/1920  United Kingdom ................ 408/97

*Primary Examiner*—Daniel W. Howell
*Attorney, Agent, or Firm*—Barlow & Barlow, Ltd.

[57] ABSTRACT

A drill guide apparatus for lens workpieces, having a substantially C-shaped base and threaded screw member, is provided. The drill guide apparatus includes a threaded aperture through the C-shaped base member for receiving the threaded screw member to clamp the drill guide apparatus to a lens workpiece. The screw member includes an axial bore through its entire length. An exit aperture is provided on an opposing side of the C-shaped base member for aligning the drill guide apparatus on a pre-marked spot on the lens workpiece. With the drill guide apparatus clamped in place, accurate drilling can be achieved without damaging the workpiece.

5 Claims, 4 Drawing Sheets

LENS DRILL GUIDE

BACKGROUND OF THE INVENTION

The present invention relates generally to a drill guide for facilitating the accurate drilling of holes through a workpiece. More specifically, the present invention relates to the accurate drilling of holes through delicate eyeglass lenses, and the like.

In the optical and eyeglass industry, the frame-less spectacle has become extremely popular over the years. Eyeglasses with frames include hardware such as hinges and nose supports, affixed directly to the frame of the spectacle. In contrast, frame-less spectacles have no such frame to carry the necessary hardware for the eyeglass temples, nose supports, and other components. As a result, this hardware must be mounted directly to the lens. Such mounting necessitates the drilling of holes through the eyeglass lenses at the appropriate positions to accommodate the various required hardware.

In the assembly and repair of such frame-less spectacles, accurate drilling through the eyeglass lenses is required. The optical technician typically places a mark on the lens where the hole is desired. Then, the drill bit, installed in a mechanical drill, is placed directly over the mark on the lens and the drilling is started. Since the surface of an eyeglass lens is extremely smooth, skidding or skipping after drilling has begun can easily occur. Further the angle of the hole through the lens must be controlled manually by the technician during the drilling process. If a drill bit skids across the surface of a lens or the hole is improperly drilled, the entire lens must be scrapped.

In fields other than the optical industry, various attempts have been made to control the drilling of holes through a workpiece. For example, U.S. Pat. No. 2,181,746, issued to Siebrandt, incorporated herein by reference, discloses a combination bone clamp and adjustable drill guide which assists in the accurate drilling of holes through workpieces. In particular, this device includes a forceps for clamping the workpiece and a cap member for guiding the drill bit. In addition, U.S. Pat. No. 5,163,792, issued to Slavik, incorporated herein by reference, discloses a drill guide clamp apparatus which includes a clamp structure for holding a workpiece while a bushing head guides the drill bit.

These prior art drill guides fail to address the specific needs of a drill guide for the optical industry; namely, for spectacle eyeglasses. The prior art drill guides are designed for use in connection with the drilling of holes through industrial materials, such as wood and metal objects.

Due to the demand for a drill guide which is capable of effectively drilling holes through a spectacle lens, it is desirable for a drill guide to include a special clamping mechanism which can accommodate delicate eyeglass lenses. It is also desirable to include a system which facilitates the drilling of a wide array of hole sizes to accommodate different hardware which can be installed on an eyeglass lens. It is also desirable that the drill guide, when secured in place, does not damage the eyeglass lens.

SUMMARY OF THE INVENTION

The present invention preserves the advantages of prior art drill guides for drilling holes through a workpiece. In addition, it provides new advantages not found in currently available drill guides, and overcomes many disadvantages of such currently available drill guides.

The invention is generally directed to a novel and unique drill guide with particular application in drilling holes through delicate eyeglass lenses. The lens drill guide of the present invention enables the simple, easy and accurate drilling of hardware holes through an eyeglass lens without causing any damage to the lens itself.

The preferred embodiment of the present invention includes two primary members. A substantially C-shaped base member, which is configured for embracing a workpiece to be drilled, is provided. The base member includes a first leg and a second leg which are substantially parallel to one another. The first leg includes a threaded aperture therethrough while the second leg includes an exit aperture therethrough. A screw member, having threading thereon is threadably engageable with the first leg via the threaded aperture in the first leg. The screw member includes a drill guide bore extending completely therethrough along its longitudinal axis.

In operation, according to the present invention, the desired frame hardware, to be installed, is aligned on the lens in the desired position. The holes of the hardware are then marked with a felt tip pen, for example. In the preferred embodiment, a clear, lens protector static cling label is placed over the lens so it covers both sides of the area of the lens to be drilled. This label helps protect the lens from scratches during the drilling process. The screw member is then partially threaded through the first leg of the base member and the entire unit is slipped over the edge of the lens to be drilled with the exit aperture aligned over the marked position on the lens. The screw member is then further threaded through the first leg so the screw contacts the lens via the protective label. With the drill guide firmly tightened and locked into place on the lens, drilling through the drill guide bore can be achieved to create the desired hardware hole in the lens. The screw member is then loosened and the entire drill guide is removed along with the lens protector from the lens.

It is therefore an object of the present invention to provide a drill guide which can accommodate the drilling of holes through delicate eyeglass lenses, and the like.

Another object of the present invention is to provide a drill guide which can guide the drilling of holes in an eyeglass lens for the mounting of frame hardware.

It is a further object of the present invention to provide a lens drill guide which can easily accommodate different drill bit sizes to achieve frame hardware holes and lenses of various sizes.

It is yet a further object of the present invention to provide a lens drill guide which facilitates the accurate drilling of holes through an eyeglass lens.

It is another object of the present invention to provide a lens drill guide which eliminates damage to the eyeglass lens during the drilling process.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
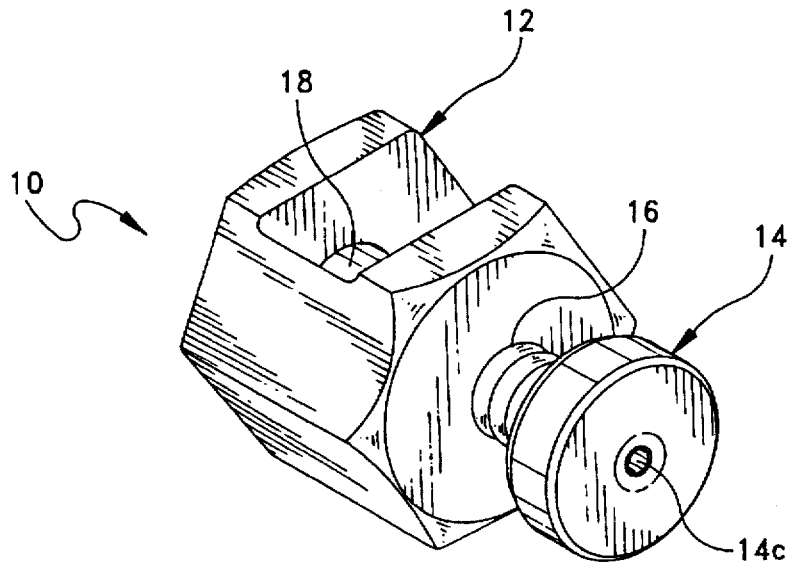
FIG. 1 is a perspective view of the lens drill guide of the present invention.

Referring to FIG. 1, the lens drill guide apparatus 10 of the present invention is generally shown to include a preferably C-shaped body 12 with a threaded aperture 16 disposed through one leg of the C-shaped body 12 and an exit aperture 18 disposed through a second leg of C-shaped body 12. Threadably insertable through threaded aperture 16 is screw 14 which serves both as a clamping member and a drill guide member via axial bore 14c.

Figure 2:
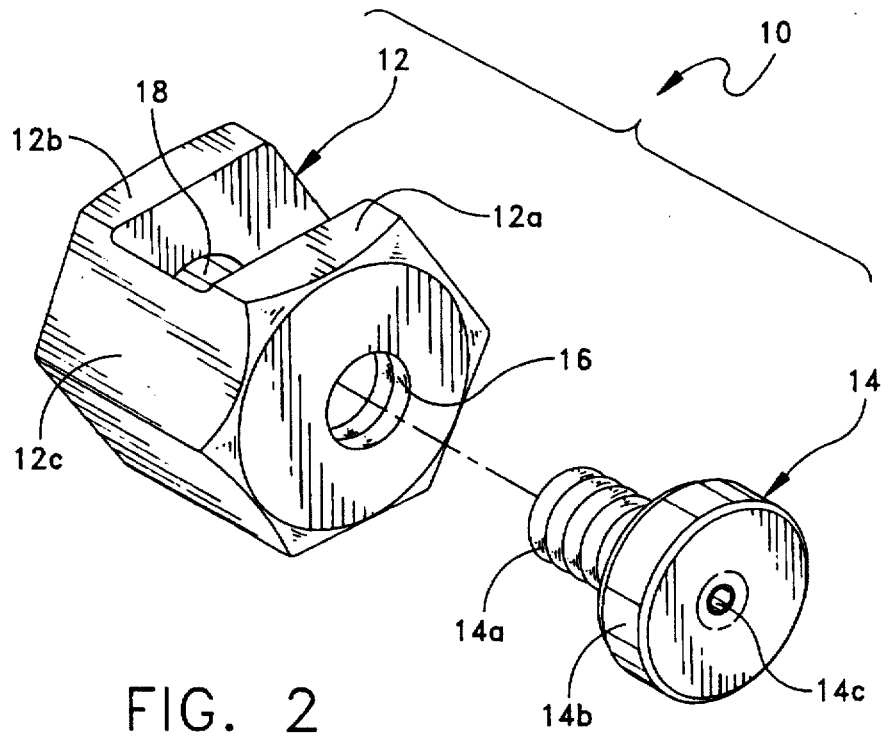
FIG. 2 is an exploded perspective view of the lens drill guide of FIG. 1.

Turning now to FIG. 2, details of the lens drill guide apparatus 10 of the present invention can be seen. C-shaped body 12 includes first leg 12a with threaded aperture 16 therethrough as well as second leg 12b with exit aperture therethrough. Connector member 12c spans between and connects first leg 12a to second leg 12b together at ends thereof. Screw 14 includes threaded shank 14a, knurled knob 14b and axial bore 14c which extends completely through screw 14 along its entire length. Screw 14 threadably engages with threaded aperture 16 via threaded shank 14a. Knurled knob 14b facilitates the threading of screw 14 into first leg 12a.

Figure 3:
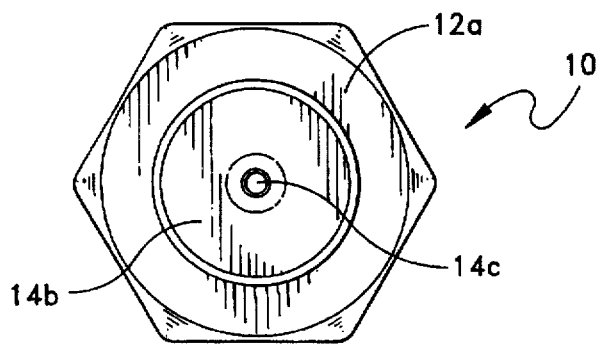
FIG. 3 is a top view of the lens drill guide of FIG. 1.
Figure 4:
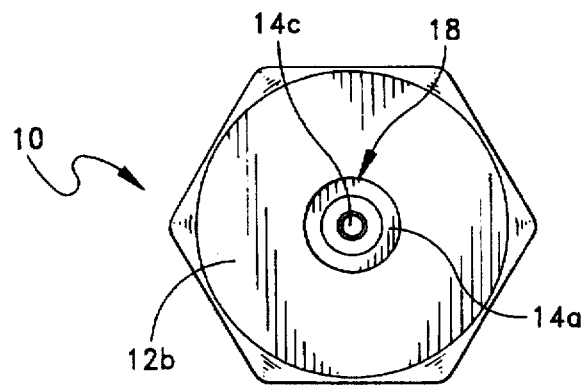
FIG. 4 is a bottom view of the lens drill guide of FIG. 1.
Figure 5:
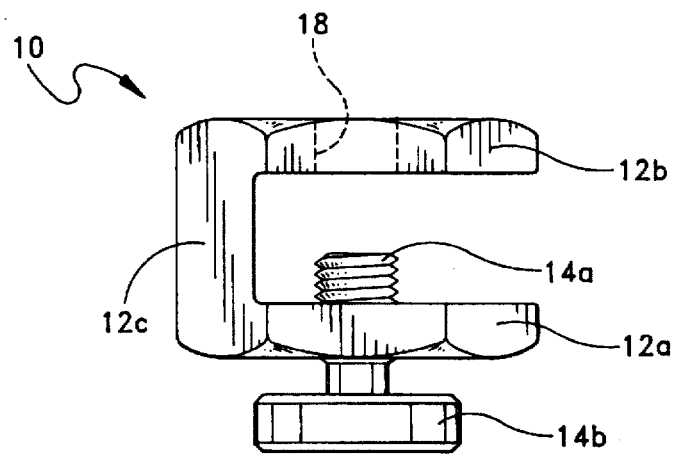
FIG. 5 is a side view of the lens drill guide of FIG. 1.

FIG. 3 shows a top view of the drill guide apparatus 10 of the present invention illustrating the alignment of axial bore 14c relative to first leg 12a. FIG. 4 illustrates a bottom view of the drill guide apparatus 10 where axial bore 14c is aligned with exit aperture 18 in second leg 12b of C-shaped body 12. Such alignment is further illustrated in FIG. 5 where exit aperture 18 in second leg 12b is disposed directly above threaded shank 14. As will be described below, exit aperture 18 provides the function of aligning the lens drill guide apparatus 10 of the present invention over the desired drilling spot while providing a pass-through for the drill bit after the hole has been drilled.

Figure 6:
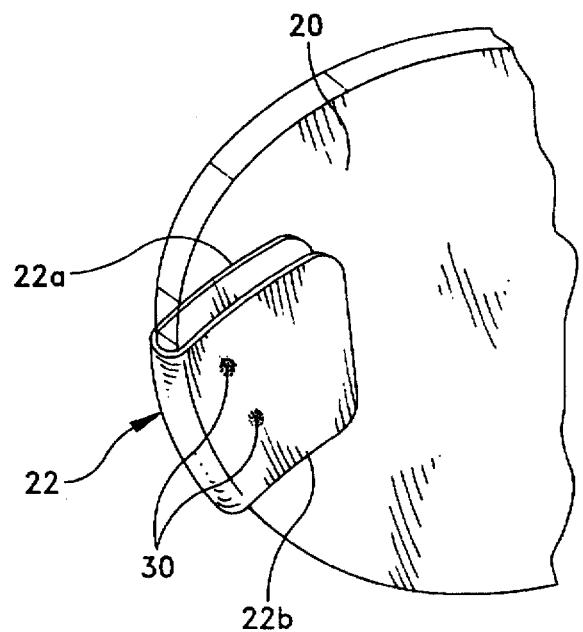
FIG. 6 is a perspective view of an eyeglass lens with a protective label installed thereon in accordance with the present invention.

Referring now to FIGS. 6–9, the operation of the lens drill guide apparatus 10, in accordance with the present invention, is shown. Referring first to FIG. 6, the lens workpiece 20 is provided. The desired frame hardware (not shown) is carefully aligned into desired position on the lens. The position of the holes of the frame hardware are marked on the lens with a felt tip pen, or the like. The frame hardware is then removed and a preferably clear static cling label 22 is placed over the lens at the region to be drilled. While a clear static cling-type label is preferably employed, other protective materials may be employed. For ease of installation, protective material or protector label 22 is formed of one piece of material and folded over the edge of the lens workpiece 20 over guide marks 30 with front flap 22a residing over the convex front portion of lens workpiece 20 while rear flap 22b resides on the rear of lens workpiece 20. Now, lens workpiece 20 is protected and ready for installation of drill guide apparatus 10 thereon.

Figure 7:
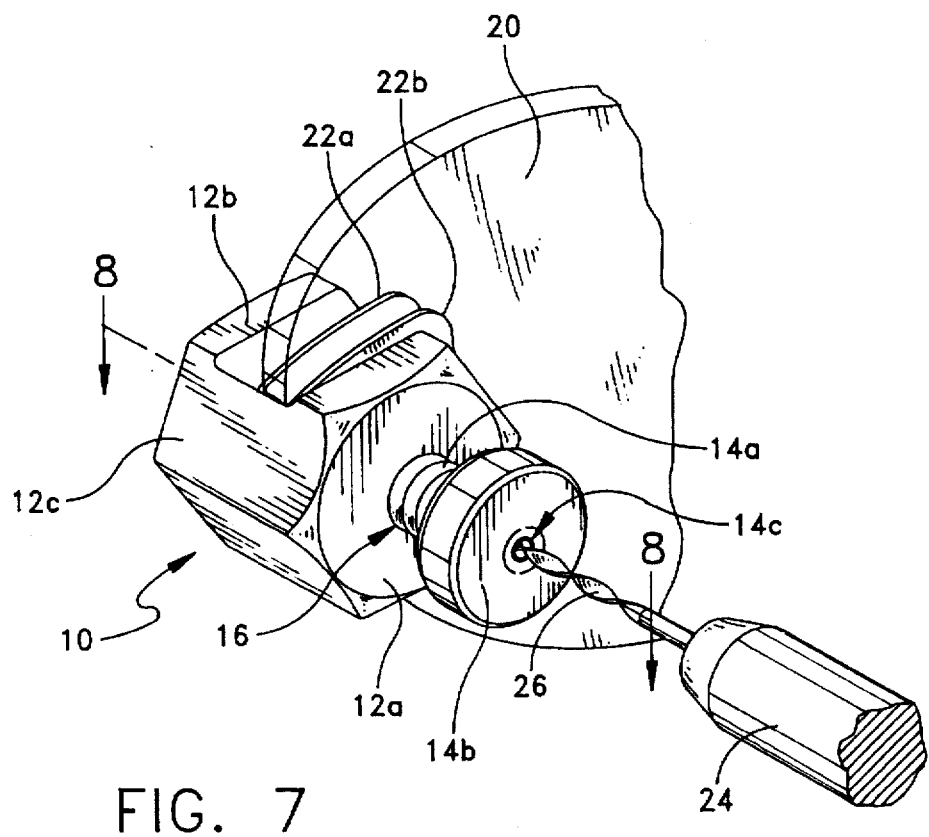
FIG. 7 is a perspective view of the lens drill guide in accordance with the present invention installed on an eyeglass lens with protective label installed therebetween.
Figure 8:
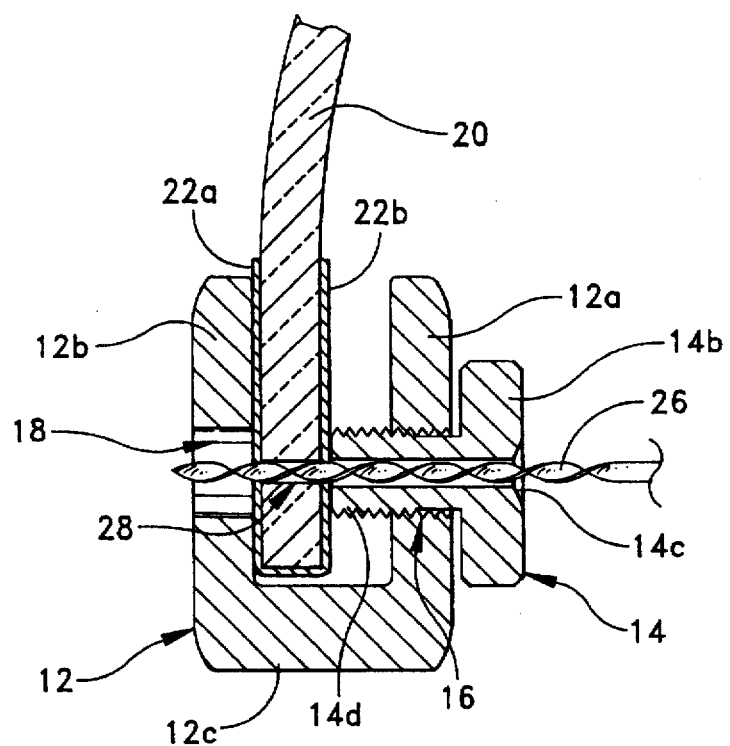
FIG. 8 is a cross-sectional view through the line 8—8 of FIG. 7.

Turning now to FIGS. 7 and 8, the installation of drill guide apparatus 10 onto lens workpiece 20 is shown in preparation for drilling. FIG. 7 illustrates a perspective view of the installation while FIG. 8 illustrates a cross-sectional view of the installation through the line 8-8 of FIG. 7. Referring both to FIGS. 7 and 8, C-shaped body 12 resides over an edge of lens workpiece 20 with second leg 12b in contact with front flap 22a of protective material 22 on the convex side of lens workpiece 20. The butt end 14d of screw 14 contacts rear flap 22b of protective material 22 in contact with the concave side of lens workpiece 20. Prior to clamping screw 14 onto lens workpiece 20, exit aperture 18 is aligned with a guide mark 30 as shown in FIG. 6. When C-shaped body 12 is in the desired position with exit aperture aligned over a guide mark 30, knob 14b of screw 14 is further threaded through threaded aperture 16 to clamp C-shaped body 12 in place on lens workpiece 20. Screw 14 should be tightened until it firmly locks C-shaped body in place but should not be overtightened to avoid damage to the lens workpiece 20.

Figure 9:
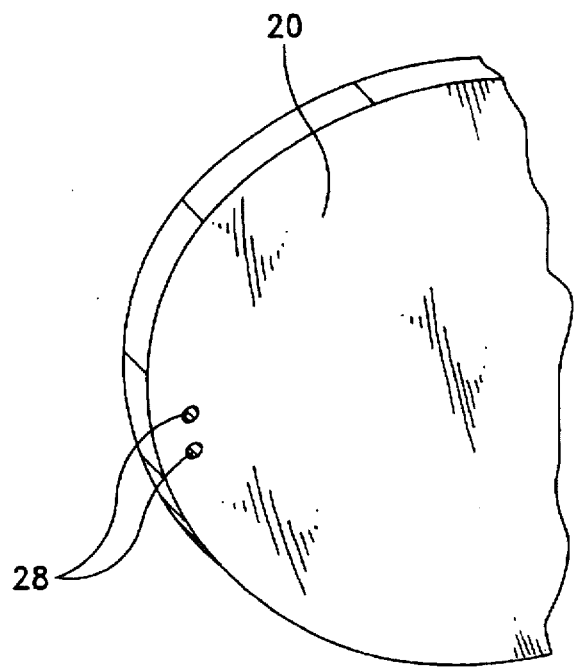
FIG. 9 is a perspective view of an eyeglass lens with hardware holes drilled with the lens drill guide of the present invention.

Now that drill guide apparatus 10 is installed on lens workpiece 20, drill bit 26 of mechanical drill 24 is inserted through axial bore 14c. Drilling is then initiated through lens workpiece 20 to create workpiece holes 28 through the precise pre-marked location as previously discussed in connection with FIG. 6. After workpiece hole 28 has been drilled, screw 14 is backed out of threaded aperture 16 enough to permit the removal of C-shaped body from lens workpiece 20. The foregoing process is then repeated as necessary to drill additional holes. After protective material is removed, lens workpiece 20 is ready for the installation of the frame hardware (not shown) as illustrated in FIG. 9.

The component parts of the drill guide apparatus 10 of the present invention are preferably made of metal for long wear life and durability. However, other materials, such as hard plastics, may be employed. Further, to increase the flexibility and usability of the drill guide apparatus 10 of the present invention, an entire set of screws 14 may be provided where each screw 14 in the set includes an axial bore 14c of a different diameter. For example, a set of three color coded screws 14 may be provided where the diameters of axial bore 14c are 1.2 mm; 1.4 mm and 2.2 mm, respectively. Each screw 14 in the set can be accommodated through the same threaded aperture 16 while providing axial bores 14c of different diameters to drill different size holes to accommodate a wide range of hardware used in the optical industry. As a result, the drill guide apparatus 10 of the present invention can efficiently accommodate delicate lens workpieces while providing flexibility in the size of the holes that can be drilled.

It would be appreciated by those skilled in the art that various changes and modifications can be made to the illustrated embodiments without departing from the spirit of the present invention. All such modifications and changes are intended to be covered by the appended claims.

What is claimed is:

1. A drill guide apparatus, comprising:
   a substantially C-shaped base member configured for embracing a workpiece to be drilled with a first side and an opposing second side; said C-shaped base member having a first leg and a second leg; said first leg including a threaded aperture therethrough;
   a screw member, having threading thereon, threadably engageable with said first leg via said threaded aperture; said screw member including an axial bore extending completely through said screw member along its longitudinal axis;
   transparent intermediary material disposed between said workpiece and said drill guide apparatus; and wherein said screw member is adjustably engageable with a first side of said workpiece and said second leg being engageable with a second side of said workpiece to accurately clamp said drill guide apparatus to said workpiece in preparation for drilling a hole therethrough via said axial bore.

2. The apparatus of claim 1, further comprising:

a knurled knob connected to said screw member to facilitate rotation thereof.

3. The apparatus of claim 1, wherein said intermediary material is plastic.

4. A drill guide apparatus, comprising:

a C-shaped body having a first leg and a second leg; said first leg including a threaded aperture therethrough;

a threaded screw member, having an axial bore therethrough, threadable through said threaded aperture;

a substantially transparent protective material disposed between said drill guide apparatus and said workpiece; and whereby said C-shaped body is clampable to a workpiece via said threaded screw to permit accurate controlled hole drilling in said workpiece via said axial bore in said thread screw member.

5. The apparatus of claim 4, wherein said second leg further includes an exit aperture.

* * * * *